US006830178B2

(12) United States Patent
Jimenez

(10) Patent No.: US 6,830,178 B2
(45) Date of Patent: Dec. 14, 2004

(54) COMBINATION BANK/PHONE CARD AND METHOD

(76) Inventor: Loreto Jimenez, P.O. Box 1166, Newport, NC (US) 28570

( * ) Notice: Subject to any disclaimer, the term of this patent is extended or adjusted under 35 U.S.C. 154(b) by 0 days.

(21) Appl. No.: 10/197,493

(22) Filed: Jul. 18, 2002

(65) Prior Publication Data

US 2003/0015589 A1 Jan. 23, 2003

Related U.S. Application Data

(60) Provisional application No. 60/306,149, filed on Jul. 19, 2001.

(51) Int. Cl.[7] .............................................. G06F 17/60
(52) U.S. Cl. ....................... 235/379; 235/375; 235/380; 235/381; 705/35; 705/30; 705/44
(58) Field of Search ................................. 235/375, 379, 235/383, 380, 493; 705/39, 41, 35, 30, 44

(56) References Cited

U.S. PATENT DOCUMENTS

| 5,487,107 | A |   | 1/1996  | Atkins et al.    |            |
|-----------|---|---|---------|------------------|------------|
| 5,504,808 | A |   | 4/1996  | Hamrick, Jr.     |            |
| 5,530,232 | A |   | 6/1996  | Taylor           |            |
| 5,719,926 | A | * | 2/1998  | Hill             | 379/115.02 |
| 5,850,599 | A |   | 12/1998 | Seiderman        |            |
| 5,915,007 | A |   | 6/1999  | Klapka           |            |
| 5,991,748 | A |   | 11/1999 | Taskett          |            |
| 6,000,608 | A |   | 12/1999 | Dorf             |            |
| 6,032,136 | A |   | 2/2000  | Brake, Jr. et al.|            |
| 6,651,885 | B1| * | 11/2003 | Arias            | 235/381    |

FOREIGN PATENT DOCUMENTS

| EP | 402302  | 6/1990 |
| GB | 2215897 | 9/1989 |

* cited by examiner

Primary Examiner—Michael G. Lee
Assistant Examiner—Ahshik Kim
(74) Attorney, Agent, or Firm—Richard C. Litman

(57) ABSTRACT

A combination bank/calling card and method for personal telephone, merchant and bank transactions is described. The bank/phone card is similar to a debit/credit card that can be used as a debit or credit card and a telephone card which utilizes a single account number. As a telephone card, a user would dial a special telephone number to used the card, input the account number, input a personal identification number (PIN), and dial the number to be called. A processing hub would This would allow a user to utilize their credit or debit card as a telephone card without the handling multiple cards.

2 Claims, 3 Drawing Sheets

COMBINATION BANK/PHONE CARD AND METHOD

CROSS-REFERENCE TO RELATED APPLICATION

This application claims the benefit of U.S. Provisional Patent Application Ser. No. 60/306,149, filed Jul. 19, 2001.

BACKGROUND OF THE INVENTION

1. Field of the Invention

The present invention relates generally to transaction cards. More specifically, the invention is a combination bank/phone card that can be used for bank transactions including purchasing retail items and making virtually unlimited phone calls.

2. Description of Related Art

Numerous transaction cards have been devised for making debit and merchant or point of sale (POS) related transactions. Recent developments in the use of transaction cards have included the use of disposable phone cards which include predetermined money and associated time limits for use. Some disadvantages with the conventional transaction cards include the assessment of hidden toll fees which minimize telephone use time, and/or the need for numerous telephone codes to weave through the telephone network maze in order to make a simple call. The combination bank/phone card unlike the conventional transaction card systems described below, alleviates these conventional problems by utilizing a phone and banking sponsor network accessed by a single account number with direct telephone connections made toll free via a single personal identification number (PIN).

U.S. Pat. No. 5,487,107, issued to Atkins et al., discloses a method and apparatus for processing telephone calls charged to credit cards. When a telephone caller charges a call to a commercial credit card an announcement which includes the name of the credit card issuer is supplied to the caller after validation of the credit card. The issuer of the commercial credit card is identified, for purposes of announcing its name, by examining a prefix code of a credit card number supplied by the calling party. Also, the name of the telephone card holder is supplied as a part of the announcement given prior to connecting the calling station to the called station after validation of the credit card.

U.S. Pat. No. 5,504,808, issued to Hamrick, Jr., discloses a secured disposable debit card calling system and method. Identifying indicia are disposed on a telephone debit card surface, and temporarily covered so that it cannot be visually or photographically detected. A debit card is purchased from a distribution terminal or device. After purchase therefrom, a user is able to remove the temporary covering and access a telephone service system by accessing a central server via identified indicia located on the card. The central server monitors limited access of a user's telephone usage. A toll charge is assessed against a user's predetermined debit limit. Separate toll rates are included for different forms of calls, e.g., interstate long distance, intrastate long distance, local, or even collect or conference calls or modem services.

U.S. Pat. No. 5,530,232, issued to Taylor, discloses a multi-application data card comprising a memory formed with at least three memory banks or storage areas for storing and updating data relating respectively to at least one authorized holder of the card and at least two authorized applications of the card. Data storage mediums include magnetic strips and solid-state circuitry.

U.S. Pat. No. 5,850,599, issued to Seiderman, discloses a portable cellular telephone with a credit card debit system. The telephone credit card calling system works in conjunction with a cellular telephone, a local cellular network and an IXC in a telecommunications network. The portable cellular telephone has a handset and a transceiver unit, and a credit card and electronic control interface electronically interposed between the handset and the transceiver unit. The interface unit has a credit card reader and an electronic system which initially validates the credit card prior to a telephone connection with the network and the subsequent third party.

U.S. Pat. No. 5,915,007, issued to Klapka, discloses a method and system for using a frequent shopper card as a phone calling card including (a) issuing a transfer certificate with a predetermined phone time and having a first personal identification number at a terminal; and (b) adding the predetermined phone time to an account associated with the frequent shopper card having a second personal identification number based on the first identification number, at a server.

The server includes a memory containing a data structure for storing information relating to using the frequent shopper card as a phone calling card. A computer program product includes a computer storage medium having a computer program code mechanism embedded in the computer storage medium for causing a computer to allow the frequent shopper card to be used as a phone calling card. The computer program code mechanism includes a first code device configured to issue the transfer certificate with a predetermined phone time at the terminal, and a second code device configured to add the predetermined phone time to the account at the server.

U.S. Pat. No. 5,991,748, issued to Taskett, discloses an improved system for "regenerating" or adding funds to a prepaid remote memory account. The system includes a service provider network or host computer system including an account database of prepaid accounts. An integrated transaction card is issued to a consumer. One side of the card shows a prepaid telephone card for accessing the host computer system and an authorization code that allows access to an account database. The other side of the integrated transaction card is a transaction instrument which allows electronic transfers to a prepaid phone card. U.S. patents issued to Dorf (U.S. Pat. No. 6,000,608) and Brake, Jr. et al. (U.S. Pat. No. 6,032,136) disclose card system.

United Kingdom Patent No. 2,215,897, published September, 1989, and European Patent No. 402,302, published June, 1990, disclose credit card systems which allow for updating reusable prepaid phone cards.

None of the above inventions and patents, taken either singly or in combination, is seen to describe the instant invention as claimed.

SUMMARY OF THE INVENTION

The combination bank/calling card according to the invention is a single debit/credit card that can be used as a debit or credit card and a telephone card, and which utilizes a single account number. As a telephone card, a user would dial a special telephone number to use the card, input the account number, input a personal identification number (PIN), and dial the number to be called. This would allow a user to utilize their credit or debit card as a telephone card without the handling of multiple cards.

Accordingly, it is a principal object of the invention to provide a single combination bank/phone card which allows simple and direct access for making purchases and virtually unlimited phone calls.

It is another object of the invention to provide a combination bank/phone card which reduces the number of phone card key codes to make direct phone calls via single toll free number.

It is a further object of the invention to provide a combination bank/phone card which operates as an independent bank, merchant and phone transaction card.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a combination bank/calling card for making bank B, phone P, and merchant and/or point of sale (POS) M transactions and a method for using said card. The preferred embodiment of the card of the present invention is depicted in FIGS. 1–3, and is generally referenced by numeral 11.

Figure 1:
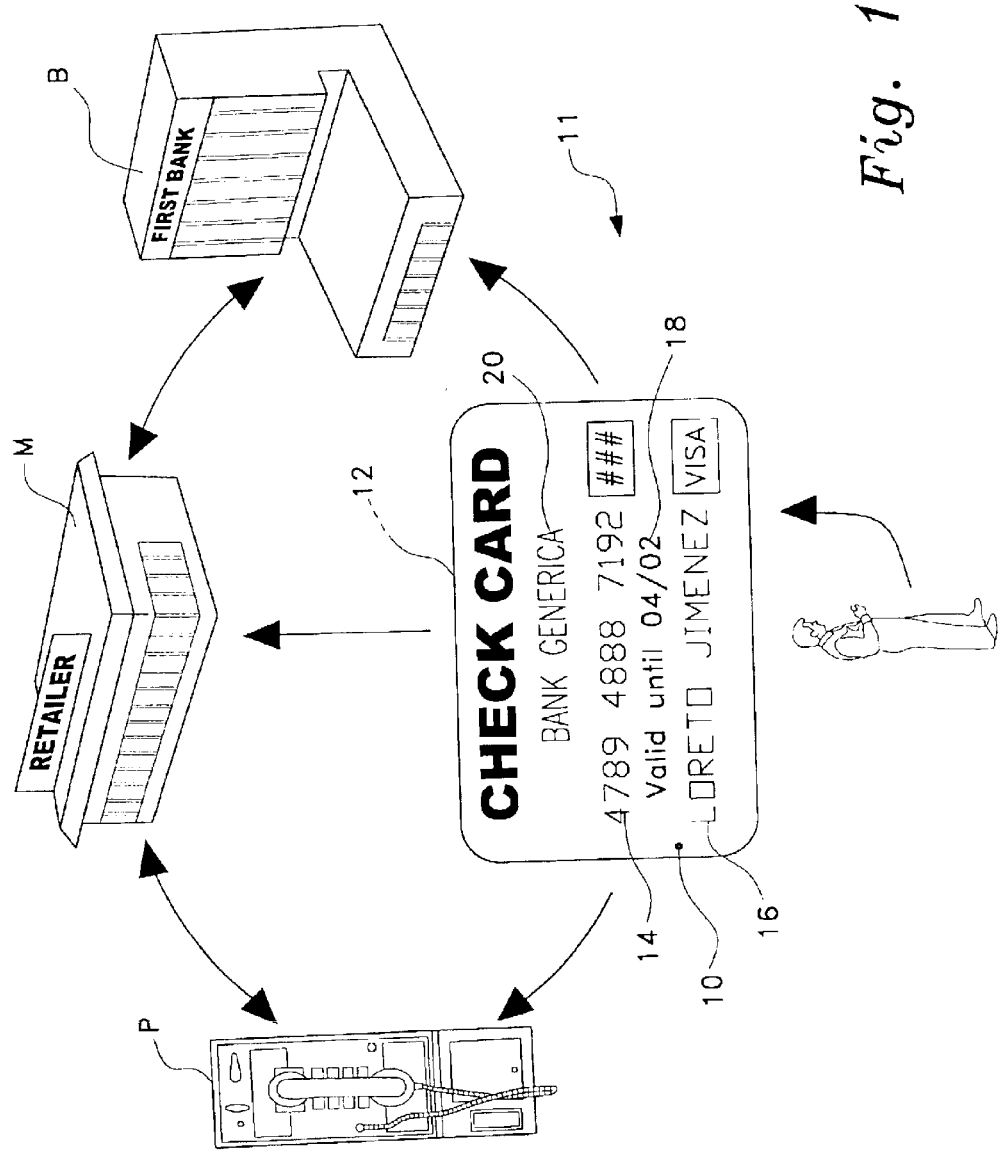
FIG. 1 is a schematic diagram showing a front view of a combination bank/phone card and elements of a transaction system which interact with the combination bank/phone card according to the present invention.
Figure 2:
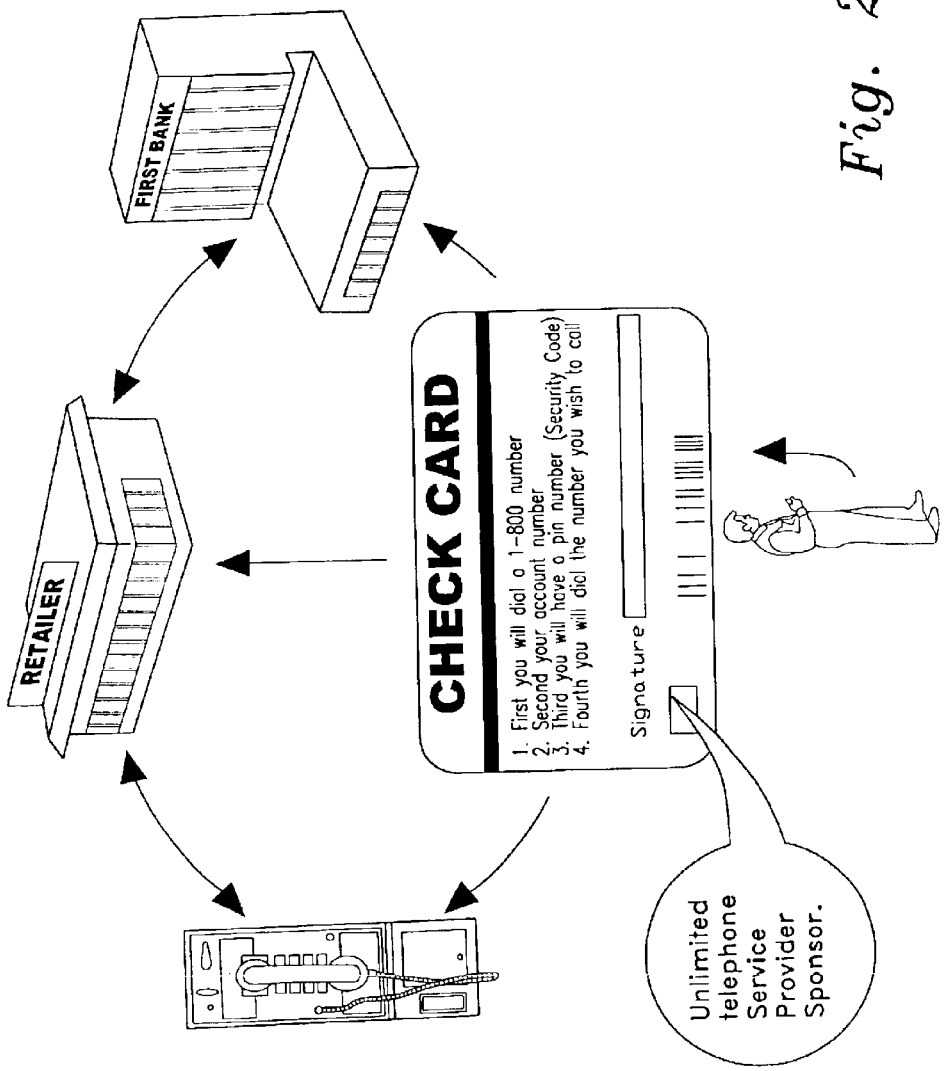
FIG. 2 is the schematic diagram of FIG. 1, but showing a rear view of the combination bank/phone card according to the invention, illustrating telephone dialing instruction indicia for making calls.
Figure 3:
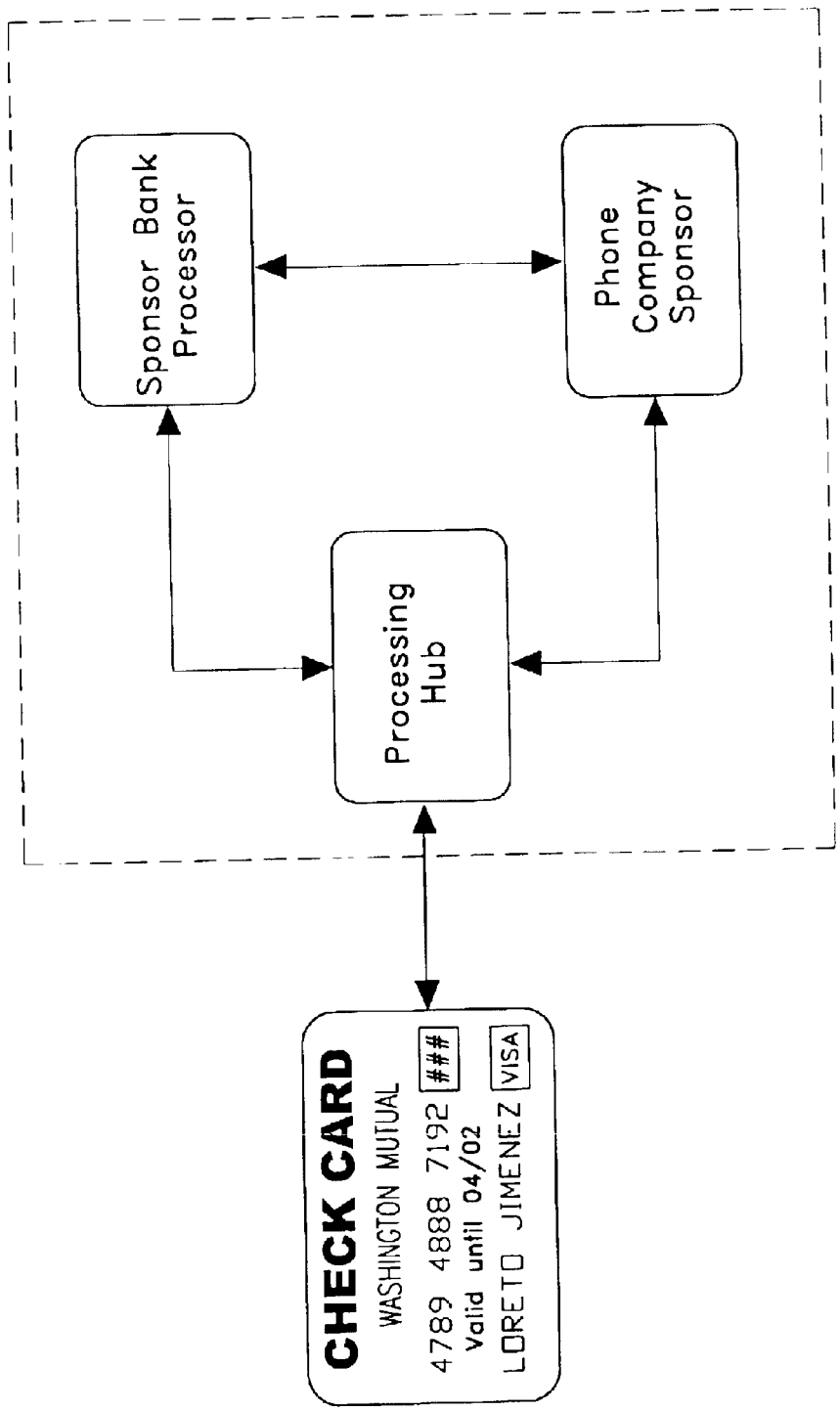
FIG. 3 is a block diagram of card transaction processing for the combination bank/phone card according to the invention.

As best seen in FIGS. 1 and 2, the combination bank/phone card 11 is shown schematically to illustrate single account transactions. As shown in FIG. 1, the combination bank/phone card 11 is shown as substantially rectangular card 11 having a front 10 and rear 12 card face. The front face 10 comprises transaction indicia formed therein representing an account number 14, card holder name 16, expiration date 18 and at least one authorized bank account card holder sponsor 20 such as Washington Mutual, Bank Generica, World Wide Bank, etc. The bank aspect of the card can include either or both debit or credit account transactions as an inherent bank account feature.

As diagrammatically illustrated in FIG. 2, the rear face 12 is shown comprising transaction instruction indicia 21 summarizing the steps required to use the invention as a phone card Generally the indicia would be as follows:

(a) dial a toll free number, such as a 1-800 number;
(b) input an account number;
(c) input a Personal Identification Number (PIN); and
(d) dial a remote party's telephone number for electronic communication with the remote party.

The rear face 12 further has at least one transaction data storage device or medium 24 used to store data of a card holder U. The data storage device 24 may also store data from the front face 10 of the card 11 in order to enable electronic transactions with at least one compatible electronic device, such as a credit card approval register, magnetic reader etc. The data storage device 24 of preference is a magnetic storage medium 24 which allows for quick and simple electronic communication with ATMs and similar devices connected with at least one bank sponsor B. Other data identifying features include the use of a bar code identifier 26 for identification with a bar code reader.

When the present invention 11 is used for telephone transactions, the card holder U would simply activate a processing hub 22 having conventional features including a central processor, area of main memory, and random access memory. A suitable hub 22 for use with the present invention is described in U.S. application Ser. No. 6,000,608, which is hereby incorporated by reference.

The method of the using the bank/phone card 11 comprises the following steps:

(1) The cardholder U dials a toll free number, e.g., a 1-800 number, connecting the cardholder U to the central processing hub 22.
(2) The processing hub 22 prompts the cardholder for his account number.
(3) The cardholder enters his account number.
(4) The processing hub 22 prompts the cardholder for his PIN number.
(5) The cardholder enters his PIN number.
(6) The processing hub 22 prompts the cardholder for the number he wishes to dial.
(7) The processing hub 22 makes contact with the phone company sponsor.
(8) The hub 22 requests billing information from the phone company and determines the cost C for a call to that number for a predetermined amount of time T.
(9) The hub 22 accesses the sponsor bank 26 and determines if there are sufficient funds in the cardholder account designated by the cardholder account number, to cover the cost determined in step 8 and then transfers that amount to a temporary account.
(10) The hub 22 signals the phone company to place the call.
(11) Just prior to the expiration of the time period T the hub 22 contacts the sponsor bank 26 and determines if the cardholder U has sufficient funds to cover the cost C determined in step 8 and transfers that amount to the temporary account.

A possible variation of the abovementioned invention is that the hub 22 could periodically insure that sufficient funds were present in the cardholder account and only withdraw funds once at the end of the transaction.

(12) The cardholder U terminates the call.
(13) The phone company 28 sends a bill to the processing hub 22.
(14) The processing hub 22 then transfers the amount of currency determined in step 13 to the phone company and refunds any excess to the cardholder's account.

It is to be understood that the present invention is not limited to the sole embodiment described above, but encompasses any and all embodiments within the scope of the following claims.

I claim:

1. A method of using a combination bank/calling card, the method comprising:

(a) connecting a cardholder to a central processing hub;

(b) said processing hub requesting a cardholder account number;
(c) transmitting said cardholder account number to said hub;
(d) said processing hub requesting a personal identification number (PIN);
(e) transmitting said PIN to said hub;
(f) said processing hub requesting a telephone number;
(g) transmitting said telephone number to said hub;
(h) said processing hub contacting a phone company and determining a cost of a call made to said telephone number for a predetermined amount of time X;
(i) said hub accessing a sponsor bank and determining if sufficient funds are present in a cardholder account designated by said cardholder number to cover the determined cost and transferring said funds into a temporary account;
(j) said hub signaling said phone company to place the call;
(k) after an allotted time period Y, prior to the termination of said time period X, said hub contacting said sponsor bank and determining if said cardholder bank account has sufficient funds to cover said determined cost and transferring said funds from said cardholder bank account to a temporary account;
(l) repeating step (d) until said call is terminated or cardholder has insufficient funds to cover said determined cost;
(m) said process hub contacting said phone company and receiving the total billing amount; and
(n) said processing hub sending sufficient funds to cover said total billing amount from said temporary account to said phone company.

2. The method of claim 1, further comprising:
returning any funds in excess of said total billing amount, subtracted from said cardholder account, to said cardholder account, to said cardholder account.

* * * * *